INVENTOR.
KENNETH A. BROWNE
BY
ATTORNEY

May 13, 1952 K. A. BROWNE 2,596,367
TRANSMISSION AND ONE-WAY CLUTCH THEREFOR
Original Filed Oct. 10, 1941 2 SHEETS—SHEET 2
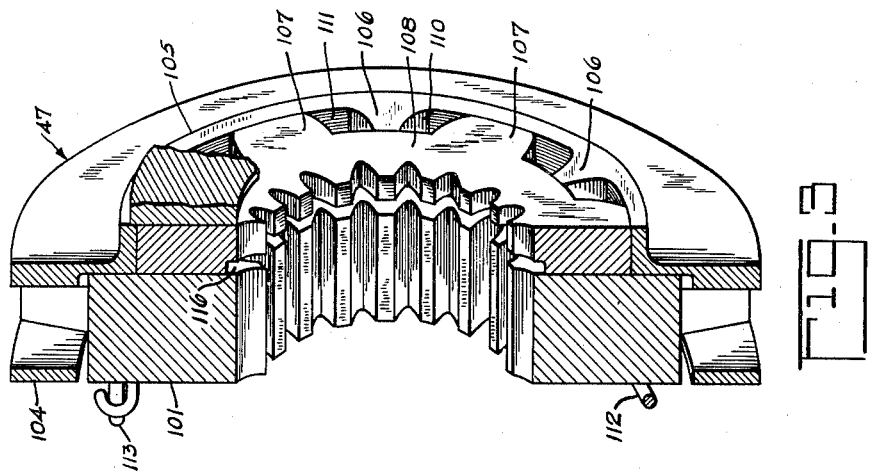
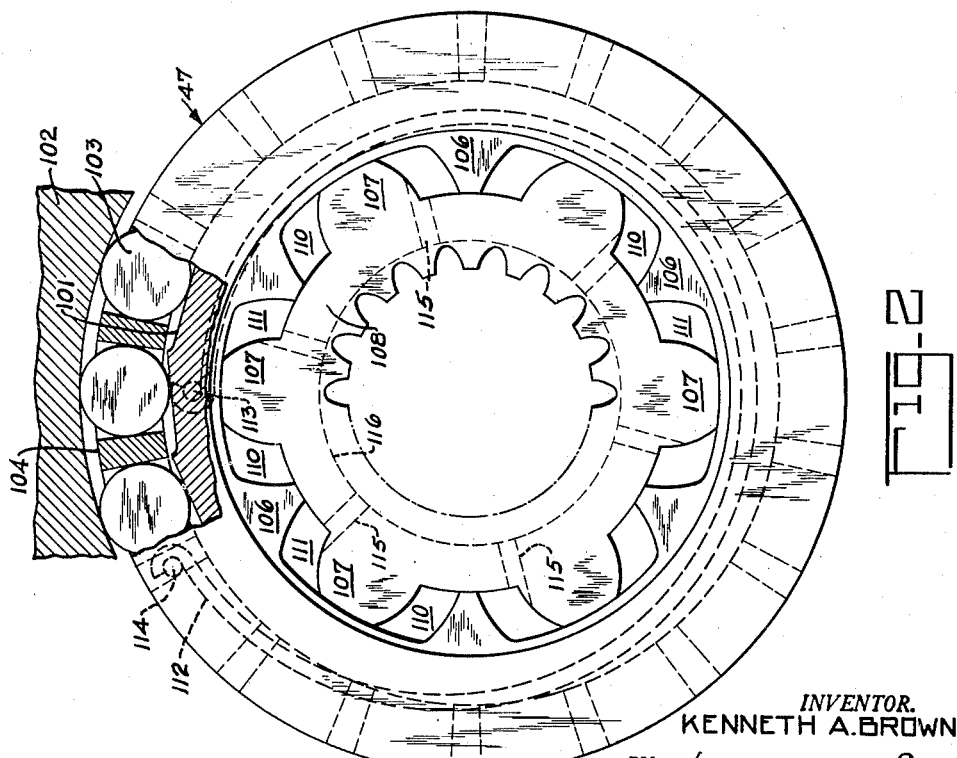
*INVENTOR.*
KENNETH A. BROWNE
BY *Victor D. Behr*
ATTORNEY Patented May 13, 1952

2,596,367

UNITED STATES PATENT OFFICE 2,596,367

TRANSMISSION AND ONE-WAY CLUTCH THEREFOR

Kenneth A. Browne, Lakewood, Ohio, assignor to Curtiss-Wright Corporation, a corporation of Delaware Original application October 10, 1941, Serial No. 414,449. Divided and this application January 29, 1949, Serial No. 73,523

10 Claims. (Cl. 74—368)

This invention relates to transmissions and is particularly directed to a transmission including a one-way clutch and to the structure of said one-way clutch. The transmission and one-way clutch structure herein disclosed is also disclosed in applicant's copending application Serial No. 414,449, filed October 10, 1941, and issued as Patent #2,482,460 on September 20, 1949, of which this application is a division.

An object of this invention is to provide a two-speed transmission having certain novel features as to gearing and shifting mechanism while an additional object is to provide a novel form of a one-way roller clutch or roller brake control whereby the rollers are moved into and out of position for driving engagement accordingly, as drive or non-drive engagement is likely to occur, thereby to decrease wear and to insure fast and positive engagement of the roller clutch with minimum slippage.

Other objects of the invention will become apparent upon reading the annexed detailed description in connection with the drawing in which:

Figure 2 is an enlarged end view, partly in section, of a roller clutch forming part of said transmission; and Figure 3 is a perspective view, partly in section, of said roller clutch.

Figure 1:
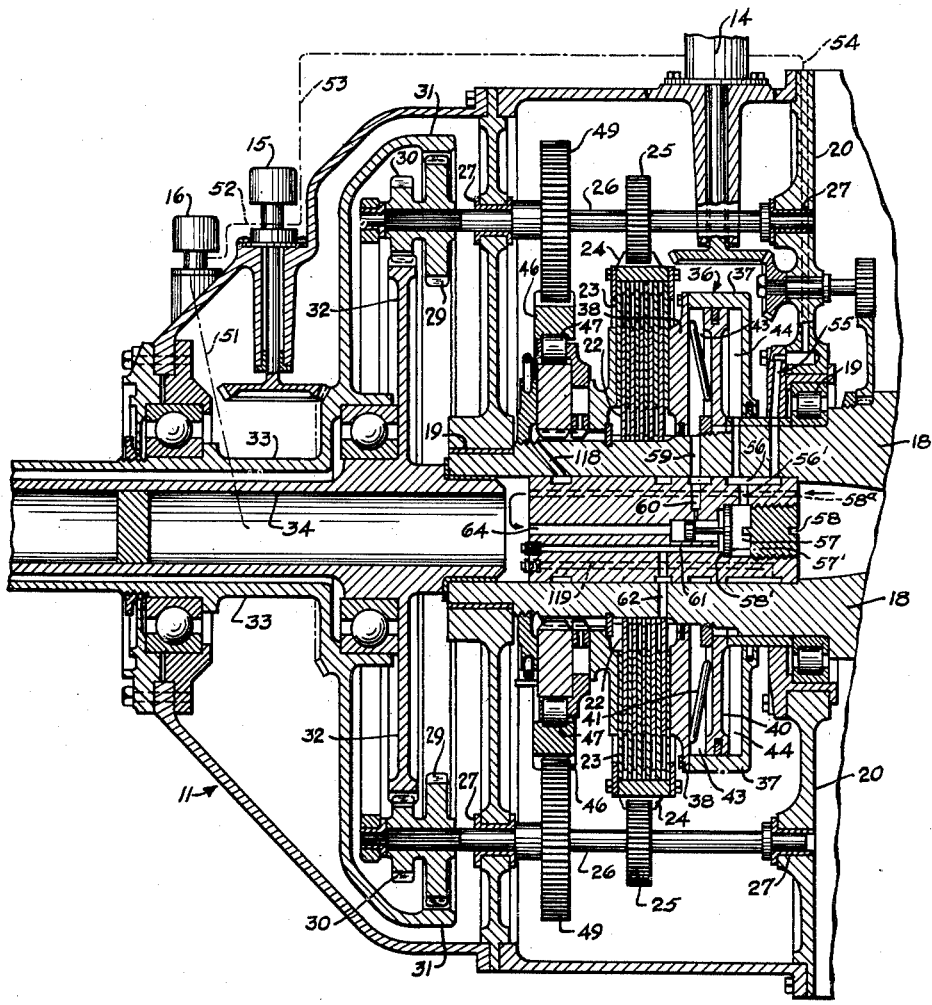
Figure 1 is a longitudinal sectional view through a two-speed transmission embodying the invention.

Referring to the drawing, a change speed transmission 11 comprises an engine driven power shaft 18 supported in bearings 19 in the engine or transmission casing 20, said shaft having a plurality of clutch plates 22 splined thereto for frictional engagement with a plurality of alternate clutch plates 23 splined at their peripheries to a gear 24 meshed with a plurality of gears 25 on layshafts 26 borne at 27 in the casing 20. These layshafts, at their forward ends, carry gears 29 and 30 respectively meshed with a ring gear 31 and a gear 32 respectively rigid with an outer driven shaft 33 and an inner driven shaft 34.

The friction clutch 22, 23 is engaged by a hydro-spring cell 36 comprising an axially slidable cylinder 37 having an abutment 38 engaging the end clutch plate 23. Within the cylinder 37 is a piston 40 secured to the shaft 18. Between the abutment 38 and the piston 40 is a spring 41 urging the clutch 22, 23 into engagement. Oil pressure may selectively be admitted to either side of the piston 40—when admitted to the lefthand cell 43, clutch engaging pressure is augmented, and when fluid pressure is admitted to the righthand cell 44, the clutch is disengaged.

At such times as the clutch is disengaged, a low ratio drive is afforded through a gear 46 having a one-way roller clutch connection 47 with the shaft 18, said gear 46 engaging a plurality of gears 49 on the several layshafts 26, said gears 49 being larger than the layshaft gears 25 to give a lower drive ratio than is afforded by the gears 25 meshed with the gear 24.

The details of the roller clutch 47 will be described later but from the structure thus far recited, it will be apparent that when the clutch 22, 23 is engaged, the layshafts 26 will be driven at high speed to afford a high ratio drive for the driven shafts 33 and 34 during which time the roller clutch 47 overruns. As the clutch 22, 23 is released, the drive drops back to low ratio on the roller clutch 47.

The speed ratio of the transmission is controlled by governor devices 14, 15, and 16 arranged in series. The governor device 16 is fed with oil pressure from the interior of the shaft 18 through a line 51, said device being serially connected by an oil passage 52 to the governor device 15 which is serially connected by an oil passage 53 to the governor device 14 and thence to a passage 54. The details and functions of said governor devices are fully disclosed in said copending application and form no part of the present invention so that no further description of said devices is herein deemed necessary. As far as this invention is concerned it is only necessary that means be provided for supplying a fluid under pressure, such as oil, to the passage 54 and for venting said passage.

The passage 54 is connected by appropriate drillings in the transmission casing with an oil transfer bearing 55 and a passage 56 leading to the righthand cavity 44 of the cell 36 and to a cylinder 57 formed in a plug 58 disposed within the hollow interior of the shaft 18. The plug 58 is provided with one or more passages 58a for transmitting oil pressure therethrough. When oil under pressure is supplied to the passage 54 said pressure is directed to the cell cavity 44 for disengagement of the clutch 22, 23 to provide a low ratio drive to the shafts 33 and 34. As oil pressure is admitted to the cavity 44, it is also admitted through passage 56' to the cylinder 57 to drive a differential piston 47' to the left, thereby allowing fluid to bleed from the cell cavity 43 through passages 59, 60, 61 and 62 to the interior of the transmission case. An annular shoulder 58', at the left end of the cylinder 57, limits the leftward movement of the piston 57' to the position illustrated in Figure 1 to prevent the piston from covering the passage 61. When the cell cavity 44 and the cylinder 57 are vented, as a result of venting of the passages 54 and 56, oil pressure within the crankshaft, as applied through the passage 64, drives the differential piston 57' to the right to uncover the passage 60 whereby oil under pressure enters the cavity 43 through the passages 64, 60 and 59. This oil pressure in the cavity 43 augments the action of the spring 41 in forcing engagement of the clutch 22, 23 thereby providing the high ratio drive to the shafts 33 and 34.

To summarize the shift between high and low ratio; for high ratio it is necessary that the clutch 22, 23 be engaged so that the cavity 44 must be vented through the passages 54 and 56. Therefore, as long as the passages 54 and 56 are vented the transmission will remain in high ratio. In order for the transmission to shift to low ratio, it is necessary that fluid under pressure be supplied to the cavity 44 so as to disengage the clutch 22, 23. Accordingly, in order to shift to low ratio fluid under pressure must be supplied to the passages 54 and 56.

Reference may now be made to Figures 2 and 3 which show the details of the construction of the roller clutch 47. This device comprises an inner race 101 having peripheral sloped tracks or ramps and an outer race 102 having a cylindrical bore. A plurality of rollers 103 are disposed between the races 101 and 102 and the rollers are loosely embraced by a cage 104 having a plurality of cavities, one for each roller 103. The cage 104 is provided with a lateral extension 105 having circumferentially spaced internal gear teeth or splines 106. These are shown with the form of internal gear teeth, which is a convenient form for fabricating purposes, but they may also be fabricated merely as inwardly directed vanes. These teeth 106 alternate, in spaced relationship, with outwardly extending teeth or vanes 107 formed on a member 108 rotationally rigid with the inner race 101 of the roller clutch. The vanes 106 and 107 define therebetween a plurality of cavities 110 and 111 allowing of limited circumferential movement between the elements 104 and 108, this movement being of such order as to be substantially equal to the possible circumferential movement of the rollers 103 on the rams of the inner race 101 between their full driving position and their fully disengaged position. By varying pressure fluid into the cavities 111, the cage 104 is moved clockwise relative to the race 101 to enforce movement of the rollers to their driving position. The rollers will of course drive when driving torque on the race 102 is clockwise with respect to the race 101. If pressure fluid is relieved from the cavities 111, the cage 104 may move counter-clockwise with respect to the race 101 to move the rollers 103 leftwardly along the ramps, shown in part in Figure 2, out of any posible driving engagement between the races 101 and 102, such movement being enforced by a torsion spring 112 anchored at 113 to the race 101 and at 114 to the cage 104.

Admission of pressure fluid to the cavities 111 is through radial drillings 115 communicating with an annulus 116 between the elements 101 and 108. Referring back to Figure 1, this annulus is in communication, through drillings 118 and 119, with the passage 56. As was pointed out previously, fluid pressure existing in this passage 56 serves to disengage the friction clutch 22, 23 and when such disengagement occurs, the roller clutch 47 should be ready for engagement. Thus, the fluid pressure serving to disengage the friction clutch makes the roller clutch ready for engagement. When the fluid pressure in the passage 56 is cut off, the friction clutch is engaged and likewise the roller clutch is disengaged allowing the spring 112 to hold the rollers out of forced contact with their races 101 and 102 to minimize wear in the roller clutch unit.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A one-way roller clutch comprising a pair of concentric races forming a plurality of circumferentially spaced wedge-shaped spaces therebetween; rollers disposed in said wedge-shaped spaces; spring means for urging said rollers toward the large ends of their wedge-shaped spaces; and fluid pressure means for moving said rollers against said spring means toward the small ends of their wedge-shaped spaces.

2. A one-way roller clutch comprising a cylindrical race; a polygonal race concentric with said cylindrical race; rollers between said races; a cage within which said rollers are carried and with which they are circumferentially movable; means to shift said cage circumferentially relative to the polygonal race to hold the rollers out of driving engagement with said races and means to enforce driving engagement of the rollers with both said races.

3. A one-way roller clutch comprising a cylindrical race; a polygonal race concentric with said cylindrical race; rollers between said races; a cage within which said rollers are carried and with which they are circumferentially movable, spring means to shift said cage circumferentially relative to the polygonal race to hold the rollers out of driving engagement with said races and means to enforce driving engagement of the rollers with both said races, said last-mentioned means comprising co-acting circumferentially spaced vanes on the cage and on the polygonal race; and means to admit a fluid under pressure between alternate vanes to enforce circumferential shift of said cage against said spring means.

4. A one-way clutch comprising a pair of coaxial races; a plurality of circumferentially-spaced clutch members disposed between said races; a cage within which said clutch members are carried; spring means rotatively urging said cage relative to at least one of said races for urging said clutch members toward their clutch disengaged positions; and fluid pressure means for rotatively moving said cage in the opposite direction for moving said clutch members toward their clutch engaged positions.

5. A one-way clutch comprising a pair of coaxial races forming a plurality of circumferentially-spaced wedge-shaped spaces disposed therebetween; a plurality of rollers, one for and disposed in each of said spaces; a cage within which said rollers are carried; spring means rotatively urging said cage relative to at least one of said races for urging said rollers toward the large ends of their wedge-shaped spaces; and fluid pressure means for rotatively moving said cage in the opposite direction for moving said rollers to the small ends of their wedge-shaped spaces.

6. In a multi-speed transmission comprising means including mechanism engageable for providing a first transmission speed ratio and means including a one-way roller clutch engageable upon disengagement of said mechanism for providing a second transmission speed ratio, said one-way clutch including a pair of concentric races forming a plurality of circumferentially-spaced wedge-shaped spaces therebetween with a roller disposed in each of said spaces: the combination therewith of first means operatively connected to said mechanism and operable for effecting disengagement of said mechanism; second means operatively connected to said rollers and operable for shifting said rollers toward the small ends of their wedge shaped spaces; and means operatively interconnecting said first and second means for substantially simultaneous operation.

7. In a multi-speed transmission comprising means including mechanism engageable for providing a first transmission speed ratio and means including a one-way roller clutch engageable upon disengagement of said mechanism for providing a second transmission speed ratio, said one-way clutch including a pair of concentric races forming a plurality of circumferentially-spaced wedge-shaped spaces therebetween with a roller disposed in each of said spaces, said clutch also including a cage for maintaining the circumferential spacing of said rollers; the combination therewith of first piston means operatively connected to said mechanism and operable upon the supply of a fluid under pressure thereto for disengaging said mechanism; second piston means operatively connected to said cage and operable upon the supply of a fluid under pressure thereto for rotationally shifting said cage relative to at least one of said races for moving said rollers toward the small ends of their wedge-shaped spaces; passageways for substantially simultaneously supplying a fluid under pressure to both said piston means; and spring means for rotationally urging said cage in the opposite direction.

8. In a multi-speed transmission comprising means including mechanism engageable for providing a first transmission speed ratio and means including a one-way clutch engageable upon disengagement of said mechanism for providing a second transmission speed ratio, said one-way clutch including a pair of co-axial races with a plurality of circumferentially-spaced clutch members disposed therebetween and movable relative to at least one of said races for effecting clutch engagement, said clutch also including a cage for maintaining the circumferential spacing of said clutch members; the combination therewith of first means operatively connected to said mechanism and operable for effecting disengagement of said mechanism; second means operatively connected to said cage and operable for shifting said cage relative to at least said one race for moving said clutch members toward their clutch engaging positions; and means operatively interconnecting said first and second means for substantially simultaneous operation.

9. In a multi-speed transmission comprising means including mechanism engageable for providing a first transmission speed ratio and means including a one-way clutch engageable upon disengagement of said mechanism for providing a second transmission speed ratio, said one-way clutch including a pair of co-axial races with a plurality of circumferentially-spaced clutch members disposed therebetween and movable relative to at least one of said races for effecting clutch engagement, said clutch also including a cage for maintaining the circumferential spacing of said clutch members; the combination therewith of first piston means operatively connected to said mechanism and operable upon the supply of a fluid under pressure thereto for effecting disengagement of said mechanism; second piston means operatively connected to said cage and operable upon the supply of a fluid under pressure thereto for rotationally shifting said cage relative to at least said one race for moving said clutch members toward their clutch engaging positions; and passage means for supplying a fluid under pressure substantially simultaneously to both said piston means.

10. In a multi-speed transmission comprising means including mechanism engageable for providing a first transmission speed ratio and means including a one-way clutch engageable upon disengagement of said mechanism for providing a second transmission speed ratio, said one-way clutch including a pair of co-axial races with a plurality of circumferentially-spaced clutch members disposed therebetween and movable relative to at least one of said races for effecting clutch engagement; the combination therewith of first means operatively connected to said mechanism and operable for effecting disengagement of said mechanism; second means operatively connected to said clutch members and operable for moving said clutch members toward their clutch engaging positions; and means operatively interconnecting said first and second means for substantially simultaneous operation.

KENNETH A. BROWNE.

REFERENCES CITED

The following references are of record in the file of this patent:

UNITED STATES PATENTS

| Number | Name | Date |
|---|---|---|
| 226,302 | Galloway | Apr. 6, 1880 |
| 1,807,035 | Herman | May 26, 1931 |
| 2,031,783 | Linder | Feb. 25, 1936 |
| 2,172,653 | Flogaus | Sept. 12, 1939 |
| 2,292,988 | Bloomfield | Aug. 11, 1942 |
| 2,447,552 | Banker | Aug. 24, 1948 |
| 2,453,794 | Iavelli | Nov. 16, 1948 |
| 2,459,094 | Peterson | Jan. 11, 1949 |

FOREIGN PATENTS

| Number | Country | Date |
|---|---|---|
| 42,370 | Denmark | Aug. 7, 1930 |
| 274,571 | Great Britain | July 25, 1927 |